US 10,728,116 B1

United States Patent
Chawla et al.

(10) Patent No.: US 10,728,116 B1
(45) Date of Patent: Jul. 28, 2020

(54) INTELLIGENT RESOURCE MATCHING FOR REQUEST ARTIFACTS

(71) Applicant: EMC IP Holding Company LLC, Hopkinton, MA (US)

(72) Inventors: Vishwadeep Chawla, Hopkinton, MA (US); Senthil Thiagrajan, Westborough, MA (US); Girish Dhavaleswar, Southborough, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 133 days.

(21) Appl. No.: 15/802,935

(22) Filed: Nov. 3, 2017

(51) Int. Cl.
*H04L 12/24* (2006.01)
*G06F 9/50* (2006.01)
*H04L 12/26* (2006.01)

(52) U.S. Cl.
CPC ........ *H04L 41/5054* (2013.01); *G06F 9/5055* (2013.01); *G06F 9/5077* (2013.01); *H04L 41/5019* (2013.01); *H04L 41/5064* (2013.01); *H04L 41/0893* (2013.01); *H04L 43/0876* (2013.01)

(58) Field of Classification Search
CPC ............. H04L 47/822; H04L 29/08171; H04L 47/823; H04L 67/1012; H04L 47/788; H04L 2012/5631; G06F 21/57; G06F 21/577; G06F 8/70

USPC .......................................................... 709/226
See application file for complete search history.

(56) References Cited

U.S. PATENT DOCUMENTS

| 9,983,924 | B2 * | 5/2018 | Schnegelberger | ...... H04L 41/16 |
| 2015/0128121 | A1 * | 5/2015 | Garcia | ...................... G06F 8/65 717/170 |
| 2017/0134477 | A1 * | 5/2017 | Ben Dayan | ......... H04L 61/2007 |
| 2018/0260746 | A1 * | 9/2018 | Xiong | .................. G06F 40/279 |
| 2018/0278750 | A1 * | 9/2018 | Avila | .................. H04M 3/5158 |

* cited by examiner

Primary Examiner — Mahran Y Abu Roumi
(74) Attorney, Agent, or Firm — Ryan, Mason & Lewis, LLP (57) ABSTRACT

An apparatus in one embodiment comprises a processing platform that includes a plurality of processing devices each comprising a processor coupled to a memory. The processing platform is configured to implement at least a portion of one or more cloud-based systems. The processing platform further comprises an artifact details analysis module configured to determine one or more enterprise resource attributes required for resolving a request artifact, an enterprise resource identification module configured to identify one or more available enterprise resources associated with the one or more resource attributes required for resolving the request artifact, and an artifact-resource matching module configured to determine one of the identified available enterprise resources to assign to the request artifact based on one or more usage parameters attributed to the identified available resources and route the request artifact to the determined available enterprise resource.

17 Claims, 7 Drawing Sheets

INTELLIGENT RESOURCE MATCHING FOR REQUEST ARTIFACTS

FIELD

The field relates generally to information processing systems, and more particularly to techniques for efficiently managing information technology-related resources.

BACKGROUND

Information processing systems increasingly utilize reconfigurable virtual resources to meet changing user needs. For example, cloud computing and storage systems implemented using virtual machines have been widely adopted. Such cloud-based systems include, for example, Amazon Web Services (AWS), Google Cloud Platform (GCP), and Microsoft Azure. Despite the widespread availability of these and numerous other private, public and hybrid cloud offerings, there exists a significant problem in conventional practice in that there is no adequate mechanism available for efficiently scaling the tasks of identifying, deciphering and assigning service requests to appropriate enterprise resources.

SUMMARY

Illustrative embodiments of the present invention provide information processing systems configured to provide intelligent resource matching for request artifacts.

In one embodiment, an apparatus comprises a processing platform that includes a plurality of processing devices each comprising a processor coupled to a memory. The processing platform is configured to implement at least a portion of one or more cloud-based systems. The processing platform further comprises an artifact details analysis module configured to determine one or more enterprise resource attributes required for resolving a request artifact, an enterprise resource identification module configured to identify one or more available enterprise resources, across one or more cloud-based systems, associated with the one or more resource attributes required for resolving the request artifact, and an artifact-resource matching module configured to determine one of the identified available enterprise resources to assign to the request artifact based on one or more usage parameters attributed to the identified available resources and route the request artifact to the determined available enterprise resource.

Illustrative embodiments can provide significant advantages relative to conventional artifact-resource matching arrangements. For example, challenges associated with manual matching approaches are overcome through the use of a rules engine leveraging customer and team member profile data in conjunction with predictive, machine learning and data-science-driven statistical modelling. Such automated and intelligent mechanisms facilitate efficient and accurate matching of enterprise resources to artifacts.

These and other illustrative embodiments described herein include, without limitation, methods, apparatus, systems, and computer program products comprising processor-readable storage media.

DETAILED DESCRIPTION

Illustrative embodiments of the present invention will be described herein with reference to exemplary information processing systems and associated computers, servers, storage devices and other processing devices. It is to be appreciated, however, that embodiments of the invention are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources. Numerous other system configurations are possible in other embodiments.

Figure 1:
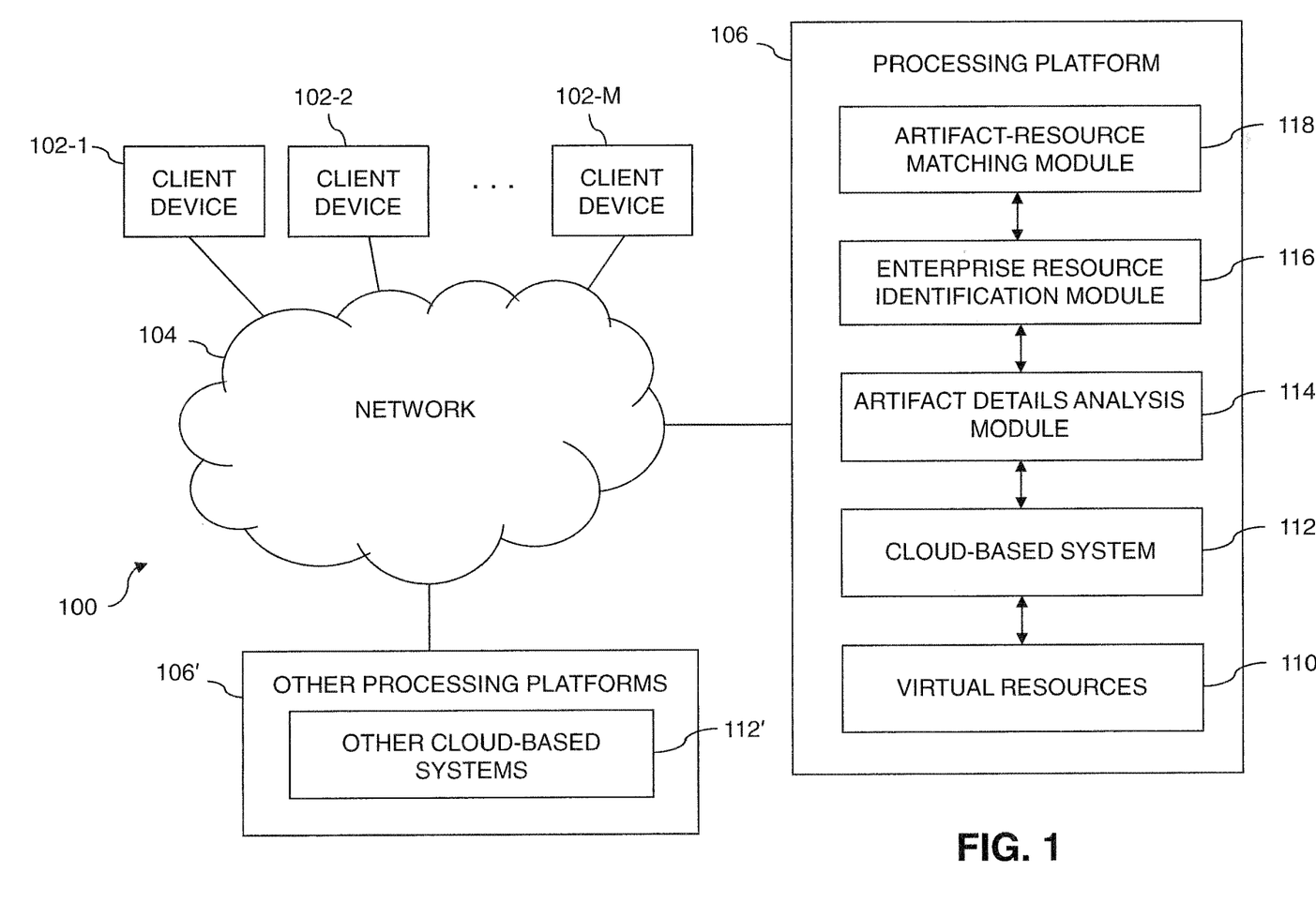
FIG. 1 is a block diagram of an information processing system configured for intelligent resource matching and swarming in an illustrative embodiment.

FIG. 1 shows an information processing system 100 configured in accordance with an illustrative embodiment of the present invention. The information processing system 100 comprises a plurality of client devices 102-1, 102-2, . . . 102-M coupled via a network 104 to a processing platform 106.

The client devices 102 in this embodiment can comprise, for example, desktop, laptop or tablet computers, mobile telephones, or other types of processing devices capable of communicating with the processing platform 106 over the network 104. Clients associated with the respective client devices 102 are assumed to run respective sets of client applications utilizing corresponding sets of virtual resources 110 of at least one cloud-based system 112 provided by the processing platform 106. For example, such clients may be respective tenants of a cloud data center or other type of multi-tenant environment provided by the processing platform 106. These tenants or other clients are examples of what are more generally referred to herein as respective "users" of the processing platform 106. Such users are also intended to include customers of a cloud service provider.

In some embodiments, the virtual resources 110 comprise a plurality of containers allocable to respective client applications under the control of the cloud-based system 112. Additional or alternative virtual resources that may be used in a given embodiment include virtual machines. For example, the virtual resources may comprise a plurality of virtual machines allocable to respective ones of the client applications under the control of the cloud-based system 112. Various combinations of containers, virtual machines and other virtual resources may be used in other embodiments. For example, virtual resources may comprise containers running in virtual machines.

The network 104 over which the client devices 102 and the processing platform 106 communicate illustratively comprises one or more networks including, for example, a global computer network such as the Internet, a wide area network (WAN), a local area network (LAN), a satellite network, a telephone or cable network, a cellular network, a wireless network implemented using a wireless protocol such as Wi-Fi or WiMAX, or various portions or combinations of these and other types of communication networks.

The processing platform 106 is assumed to include a plurality of processing devices each having a processor coupled to a memory, and is configured to implement the virtual resources 110 of the cloud-based system 112 for use by client applications.

The processing platform 106 further comprises an artifact details analysis module 114, an enterprise resource identification module 116 and an artifact-resource matching module 118, each associated with the cloud-based system 112. The cloud-based system 112 is also referred to herein as simply a "cloud."

Examples of different types of clouds that may be utilized in illustrative embodiments include private, public and hybrid clouds. Private clouds illustratively include on-premises clouds and off-premises clouds, where "premises" refers generally to a particular site or other physical location of the business, enterprise, organization or other entity that utilizes the private cloud. Public clouds are assumed to be off-premises clouds. Hybrid clouds comprise combinations of public and private clouds and thus may include various combinations of on-premises and off-premises portions.

The artifact details analysis module 114 is configured to determine one or more enterprise resource attributes required for resolving a request artifact. The enterprise resource identification module 116 is configured to identify one or more available enterprise resources, across one or more cloud-based systems, associated with the one or more enterprise resource attributes required for resolving the request artifact. The artifact-resource matching module 118 is configured to determine one of the one or more identified available enterprise resources to assign to the request artifact based on one or more usage parameters attributed to the one or more identified available enterprise resources, and to route the request artifact to the determined available enterprise resource.

An exemplary process utilizing artifact details analysis module 114, enterprise resource identification module 116, and artifact-resource matching module 118 of the processing platform 106 in information processing system 100 will be described in more detail with reference to the flow diagram of FIG. 5.

Also, by way of example, in some embodiments, a different cloud-based system comprises another cloud-based system implemented with cloud-based system 112 on the processing platform 106. Alternatively, the different cloud-based system can comprise another cloud-based system 112' implemented on a different processing platform 106' coupled to the network 104.

It is to be appreciated that the particular processing platform configuration illustrated in the FIG. 1 embodiment is presented by way of example only, and that other embodiments can utilize other arrangements of additional or alternative components. For example, functionality disclosed herein as being associated with two or more separate components can in other embodiments be combined into a single component.

A more particular example of an additional component that can be included in the processing platform 106 is a resource abstraction layer. Such a resource abstraction layer may be associated with the cloud-based system 112 and may comprise one or more resource abstraction frameworks such as a Mesos framework or a Cloud Foundry Diego framework. A given such framework can be configured to abstract away underlying virtual resources 110 from client applications that utilize those virtual resources.

As mentioned previously, the virtual resources 110 implemented by the processing platform 106 illustratively comprise containers. Such containers are more particularly assumed to comprise respective Docker containers or other types of Linux containers (LXCs). In embodiments that utilize containers, the processing platform 106 illustratively comprises a plurality of container host devices each implementing one or more of the containers. Each of the container host devices illustratively comprises at least one processor coupled to a memory. Such container host devices are examples of what are more generally referred to herein as "processing devices."

In some embodiments, Docker containers or other types of LXCs may be implemented on one or more Linux processing devices using Linux kernel control groups ("cgroups"). However, it is to be appreciated that embodiments of the present invention are not restricted to use with Docker containers or any other particular type of containers. Accordingly, numerous other techniques can be used in implementing containers in a given embodiment, and such techniques do not necessarily require use of the Linux cgroup feature. Clusters of containers can be managed across multiple container host devices of the processing platform 106 using container cluster managers such as Docker Swarm or Kubernetes. Such cluster managers may be implemented within or in association with the cloud-based system 112.

The processing platform 106 can also incorporate one or more container engines, such as one or more Docker engines. By way of example, a given Docker engine may be preconfigured to run on CoreOS, an open source lightweight operating system based on the Linux kernel and particularly configured to provide functionality for deploying applications in containers. Another example of a lightweight operating system suitable for use in implementing at least portions of the processing platform 106 in some embodiments is VMware® Photon OS™ which has a relatively small footprint and is designed to boot extremely quickly on VMware® platforms.

The processing platform 106 in some embodiments incorporates additional functionality, such as management and orchestration functionality. The management and orchestration functionality may be implemented, for example, in the cloud-based system 112 or components thereof, and can be provided, for example, using components such as VCE Vision™ Intelligent Operations Software, or other types of management and orchestration components, including components from Pivotal Cloud Foundry, or various combinations of multiple ones of these or other components.

In some embodiments, certain functionality of the cloud-based system 112 is made available to a user by a cloud service provider on a Software-as-a-Service (SaaS) basis. Such users may be associated with respective ones of the client devices 102 and may correspond to respective tenants of the cloud service provider.

However, the term "user" in this context and elsewhere herein is intended to be more broadly construed so as to encompass, for example, human, hardware, software or firmware entities, as well as various combinations of such entities.

It should be understood that the particular arrangements of system and platform components as illustrated in FIG. 1 are presented by way of example only. In other embodiments, only subsets of these system and platform components, or additional or alternative sets of components, may be used, and such components may exhibit alternative functionality and configurations.

Examples of processing platforms that may be used to implement at least portions of the processing platform 106 of the FIG. 1 embodiment will be described in more detail below in conjunction with FIGS. 6 and 7. A given such processing platform comprises at least one processing device comprising a processor coupled to a memory, and the processing device may be implemented at least in part utilizing one or more virtual machines or other virtualization infrastructure. Additionally, the operation of the information processing system 100 will be described in further detail with reference to the flow diagram of FIG. 5.

Figure 2:
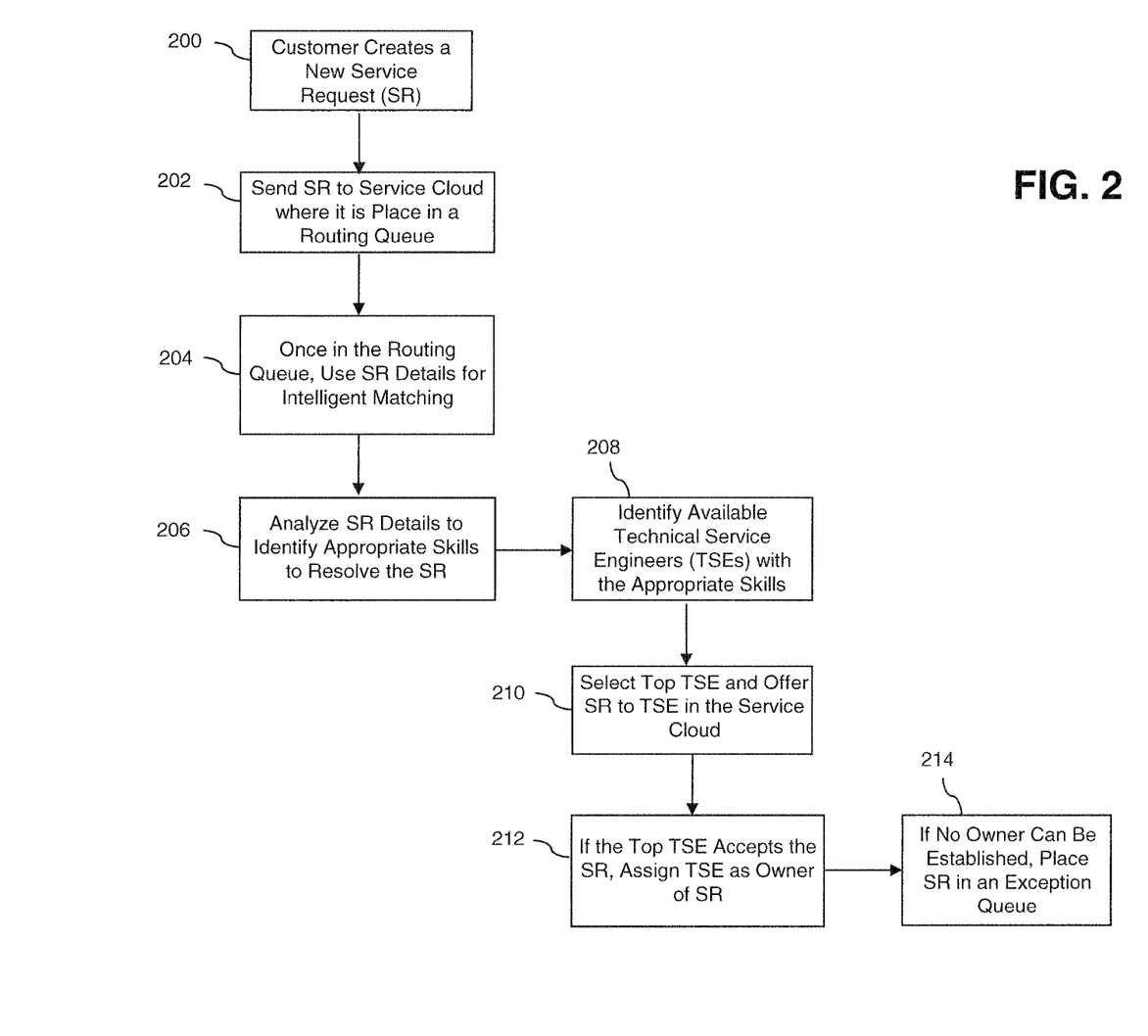
FIG. 2 shows an example intelligent matching process in an illustrative embodiment.

FIG. 2 shows an example intelligent matching process in an illustrative embodiment. In step 200, a customer creates a new service request (SR). In step 202, the SR is sent to a service cloud, where the SR is placed in a routing queue. Once in the routing queue, details of the SR can be used in step 204 for intelligent matching. In step 206, the SR details are analyzed to identify one or more skills that are appropriate and/or necessary to resolve the SR. Also, in step 208, available technical service engineers (TSEs) with the noted skills are identified. In one or more embodiments of the invention, algorithms can be implemented with respect to step 206 and/or step 208 to leverage natural language processing and machine learning.

Further, in step 210, the top TSE (from the identified available TSEs) is selected and offered the SR in the service cloud. If the selected TSE accepts the SR, the TSE is assigned the SR as owner in step 212. Also, if no owner can ultimately be established, the SR is placed in an exception queue in step 214.

Figure 3:
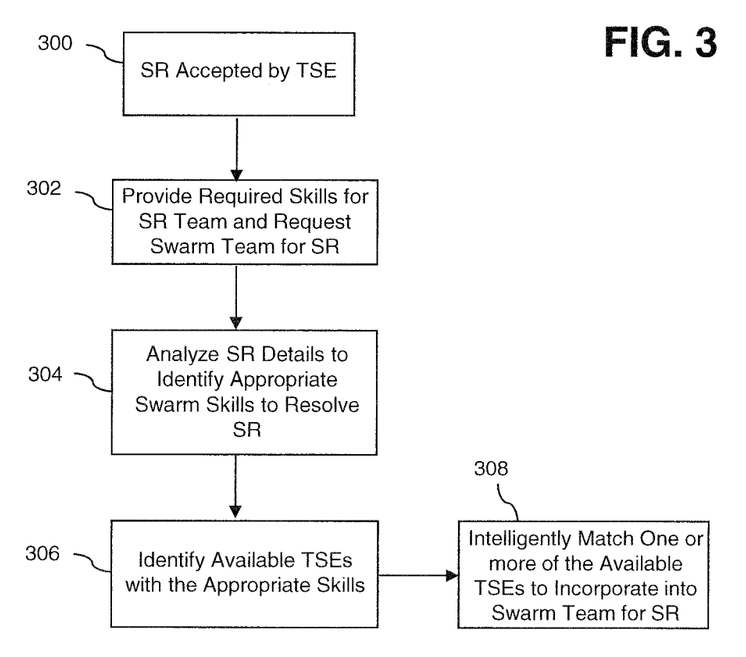
FIG. 3 shows an example intelligent swarming process in an illustrative embodiment.

FIG. 3 shows an example intelligent swarming process in an illustrative embodiment. In step 300, an SR is accepted by a TSE. In step 302, the TSE provides the required skills sought for an SR team and request the formation of a swarm team for the SR. In step 304, the SR details are analyzed to identify swarm team skills that are appropriate and/or necessary to resolve the SR. In step 306, available TSEs having the noted skills are identified, and in step 308, one or more of those available TSEs are intelligently matched to the SR to incorporate into the swarm team for resolving the SR.

As further detailed here, swarm teams can be created to resolve issues within a customer environment. By way of illustration, a swarm team can include, for example, TSEs with adjacent product skills and/or TSEs with complimentary skills. Swarm teams can also be created for consultation or escalation within a product group, and can include, for example, various subject matter experts (SMEs).

At least one embodiment of the invention includes utilizing a matching approach that can be predictive, adaptive, and/or deterministic. By way of example, a deterministic approach can include one or more filtering mechanisms, while an adaptive or predictive approach might include sorting and/or ranking mechanisms.

Figure 4:
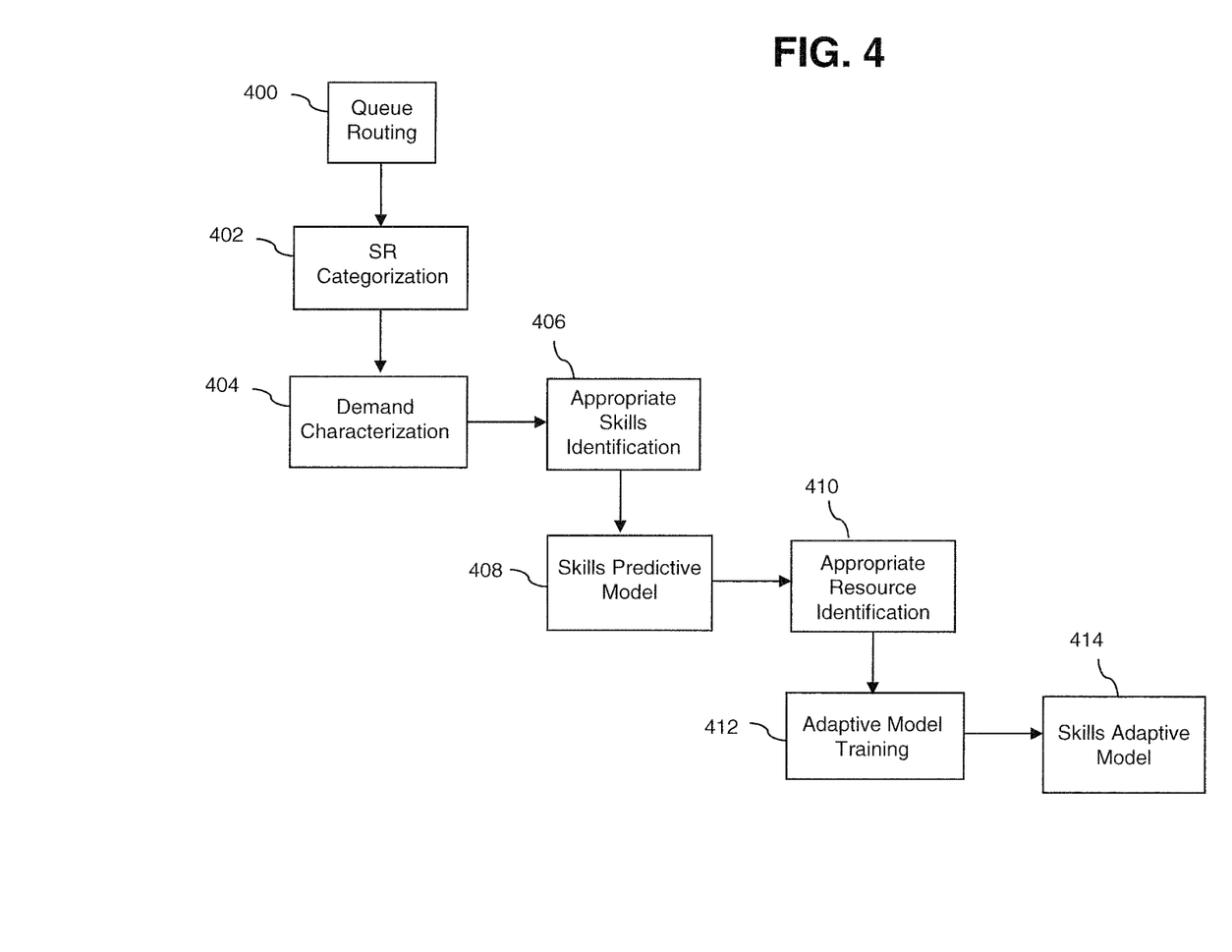
FIG. 4 shows an example predictive approach to intelligent resource matching in an illustrative embodiment.

FIG. 4 shows an example predictive approach to intelligent resource matching in an illustrative embodiment. By way of illustration, step 400 includes queue routing, which occurs prior to any modeling process. Step 402 includes an SR categorization process, wherein the SR is categorized into one of multiple (predictive) cluster models. In step 404, a demand characterization process is carried out, wherein the SR is evaluated by the appropriate cluster model and the outputs therefrom are used in step 406 to identify one or more relevant skills for resolving the SR via one or more skills models. The one or more individual skills models produce scores for each relevant skill, and predictive scores for each skill are generated via a skills predictive model in step 408.

Based on the outputs of the skills predictive model, step 410 includes identifying an appropriate resource (such as a TSE) to resolve the SR. In making this identification, a list of eligible resources (TSEs) can be filtered down based on one or more pre-determined criteria (such as business unit, shift, etc.). The resources (TSEs) are scored based on their skills, and one or more boosters or modifiers can be added on one or more bases. Further, step 412 includes training an adaptive model. In such a step, the adaptive model with adjust skill scores in the future (if a similar SR is processed) based on the acceptance and rejection information derived from offering the SR to one or more of the eligible resources (TSEs). Such adjustments will result in updating a skills adaptive model in step 414.

As noted above, one or more embodiments of the invention can also include implementing an adaptive matching process. Such a process can include a self-learning model with one or more identified input factors. By way merely of illustration, an adaptive modelling process can include collecting historical data pertaining to task assignment as input to develop one or more statistical models. Such historical data might include, for example, SR data (with the TSE who resolved the SR), skills of the TSE who resolved the SR, etc. Also, such a process can include neglecting existing keywords, and using text analytics to cluster SR descriptions to generate one or more topics. Alternatively, one or more embodiments of the invention can include utilizing existing keywords to cluster SR keywords into topics, or using topics extracted from an original SR description to filter a list of existing keywords.

Additionally, an adaptive modelling process can also include calculating the probability of successful resolution of the SR by skill and SR topic. Such a step can include assessing which skills are most appropriate for each SR topic, and/or creating a mapping between topic types and skills. Further, for each incoming SR, an adaptive modelling process can include identifying to which topic the SR belongs, and subsequently identifying one or more TSEs that possess the appropriate skills to address that topic.

As noted herein, the operation of the information processing system 100 is described in further detail with reference to the flow diagram of the example embodiment of FIG. 5. The process as shown includes steps 500 through 510, and is suitable for use in the system 100 but is more generally applicable to other systems comprising a processing platform having cloud infrastructure representation functionality. Accordingly, references to components of the embodiment of FIG. 1 in the process description below should not be viewed as limiting in any way, as the disclosed process steps can be applied in a wide variety of other types of information processing systems.

In step 500, at least one processing platform is configured to include a plurality of processing devices each comprising a processor coupled to a memory. In the context of the FIG. 1 embodiment, information processing system 100 comprises multiple processing platforms 106 and 106' as illustrated in the figure. The one or more additional processing platforms 106' may be configured in substantially the same manner as the processing platform 106. Each such processing platform comprises virtual resources for use by client applications.

In step 502, at least a portion of one or more cloud-based systems is implemented within the processing platform. For example, with reference to the FIG. 1 embodiment, virtual resources 110 of cloud-based system 112 are implemented within the processing platform 106. As mentioned previously, such cloud-based system portions (or virtual resources) illustratively comprise containers, virtual machines or combinations thereof. For example, in the context of the FIG. 1 embodiment, the virtual resources may comprise a plurality of containers allocable to respective client applications of the client devices 102 under the control of the cloud-based system 112. As another example, the virtual resources may comprise a plurality of virtual machines allocable to respective ones of the client applications of the client devices 102 under the control of the cloud-based system 112. Numerous other arrangements of virtual resources of various types and combinations can be utilized in other embodiments. For example, the virtual resources can include a plurality of virtual machines and a plurality of containers configured to run on at least a subset of the virtual machines.

In step 504, one or more enterprise resource attributes required for resolving a request artifact are determined. Such a step can be carried out, for example, by artifact details analysis module 114 in the FIG. 1 embodiment. In step 506, one or more available enterprise resources, across one or more cloud-based systems, associated with the one or more enterprise resource attributes required for resolving the request artifact are identified. Such a step can be carried out, for example, by enterprise resource identification module 116 in the FIG. 1 embodiment. In one or more embodiments of the invention, the request artifact can include a service request, the one or more enterprise resources can include one or more technical service engineers, and the one or more enterprise resource attributes can include one or more technical service engineer skills required for resolving the request artifact (service request).

In step 508, one of the one or more identified available enterprise resources are determined to assign to the request artifact based on one or more usage parameters attributed to the one or more identified available enterprise resources. Such a step can be carried out, for example, by artifact-resource matching module 118 in the FIG. 1 embodiment. The one or more usage parameters attributed to the one or more identified available resources can include, for example, a temporal parameter pertaining to how recently the identified available enterprise resources accepted request artifacts.

In step 510, the request artifact is routed to the determined available enterprise resource. Such a step can also be carried out, for example, by artifact-resource matching module 118 in the FIG. 1 embodiment. Upon receiving a rejection from the determined available enterprise resource with respect to accepting the routed request artifact, the artifact-resource matching module can be further configured to determine a second of the one or more identified available enterprise resources to assign to the request artifact based on the one or more usage parameters attributed to the identified one or more available resources, and to route the request artifact to the second available enterprise resource. Additionally, wherein the artifact-resource matching module can be further configured to route the request artifact to an exception queue upon receiving rejections from all of the one or more identified available enterprise resources.

In at least one embodiment of the invention, the artifact-resource matching module can be further configured to learn one or more items of information from an outcome of routine the request artifact to the determined available enterprise resource. Such an outcome can include, for example, the determined available enterprise resource accepting the request artifact, the determined available enterprise resource rejecting the request artifact, and/or the determined available enterprise resource resolving the request artifact in accordance with one or more parameters (such as within a service level agreement (SLA), for example). Additionally, in one or more embodiments of the invention, the artifact-resource matching module can be further configured to implement a feedback loop and determining one of the one or more identified available enterprise resources to assign to the request artifact based on one or more usage parameters attributed to the one or more identified available enterprise resources and the one or more learned items of information.

Also, in at least one embodiment of the invention, the processing platform further includes a team building module configured to determine one or more additional enterprise resource attributes related to resolving the request artifact distinct from enterprise resource attributes associated with the determined available enterprise resource. The team building module can be further configured to identify one or more additional available enterprise resources associated with the one or more additional enterprise resource attributes related to resolving the request artifact. Further, the team building module can be additionally configured to determine one of the one or more identified additional available enterprise resources to request to join a request artifact resolution team with the determined available enterprise resource, based on one or more usage parameters attributed to the one or more identified additional available resources. Also, in one or more embodiments of the invention, the one or more additional enterprise resource attributes comprises one or more technical service engineer skills associated with one or more artifacts related to the request artifact.

Figure 5:
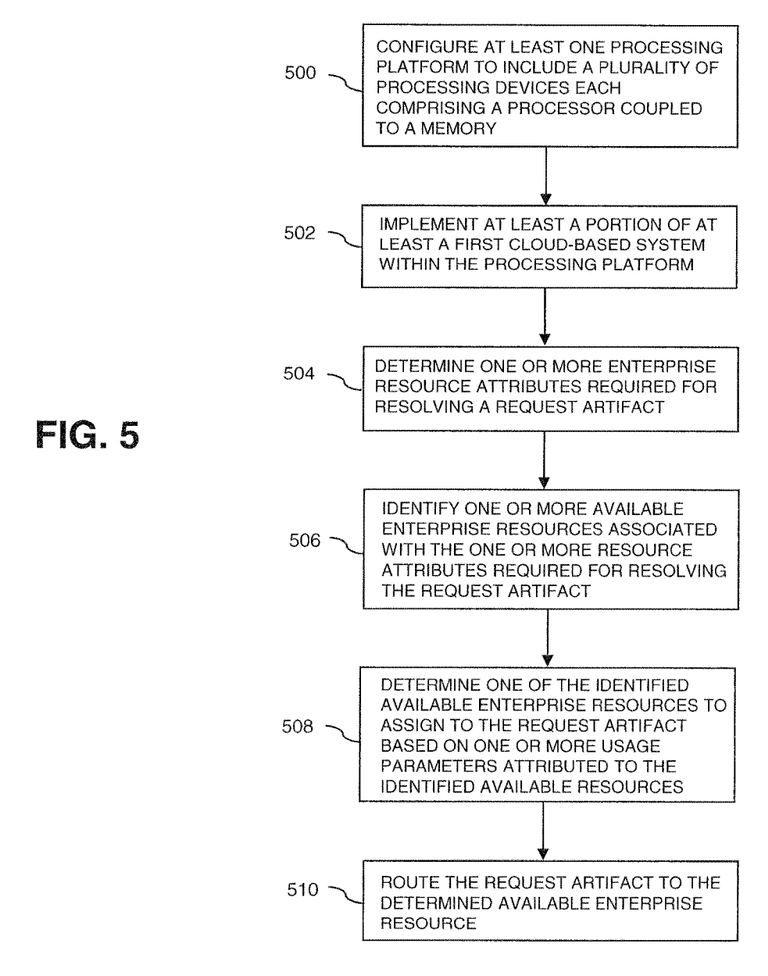
FIG. 5 is a flow diagram of a process for intelligent resource matching and swarming in an illustrative embodiment.

The particular processing operations and other system functionality described in conjunction with the flow diagram of FIG. 5 are therefore presented by way of illustrative example only, and should not be construed as limiting the scope of the disclosure in any way. Alternative embodiments can use other types of processing operations involving cloud infrastructure representation. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to carry out the techniques of one or more embodiments of the invention detailed herein.

Functionality such as that described in conjunction with the flow diagram of FIG. 5 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Illustrative embodiments of intelligent resource matching and swarming as disclosed herein can provide a number of significant advantages relative to conventional arrangements.

For example, some embodiments can advantageously provide automated and intelligent mechanisms to facilitate efficient and accurate matching of enterprise resources to artifacts. Also, one or more embodiments can implement a rules engine that leverages customer and team member profile data in conjunction with predictive, machine learning and data-science-driven statistical modelling.

Such arrangements overcome the difficulties that would otherwise be associated with conventional manual artifact-resource matching arrangements.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 may be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems such as AWS, GCP and Microsoft Azure. Virtual machines provided in such systems can be used to implement at least portions of one or more of a computer system and a content addressable storage system in illustrative embodiments. These and other cloud-based systems in illustrative embodiments can include object stores such as Amazon S3, GCP Cloud Storage, and Microsoft Azure Blob Storage.

In some embodiments, the cloud infrastructure additionally or alternatively comprises a plurality of containers implemented using container host devices. For example, as detailed herein, a given container of cloud infrastructure illustratively comprises a Docker container or other type of LXC. The containers may run on virtual machines in a multi-tenant environment, although other arrangements are possible. The containers may be utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 6 and 7. Although described in the context of system 100, these platforms may also be used to implement at least portions of other information processing systems in other embodiments.

Figure 6:
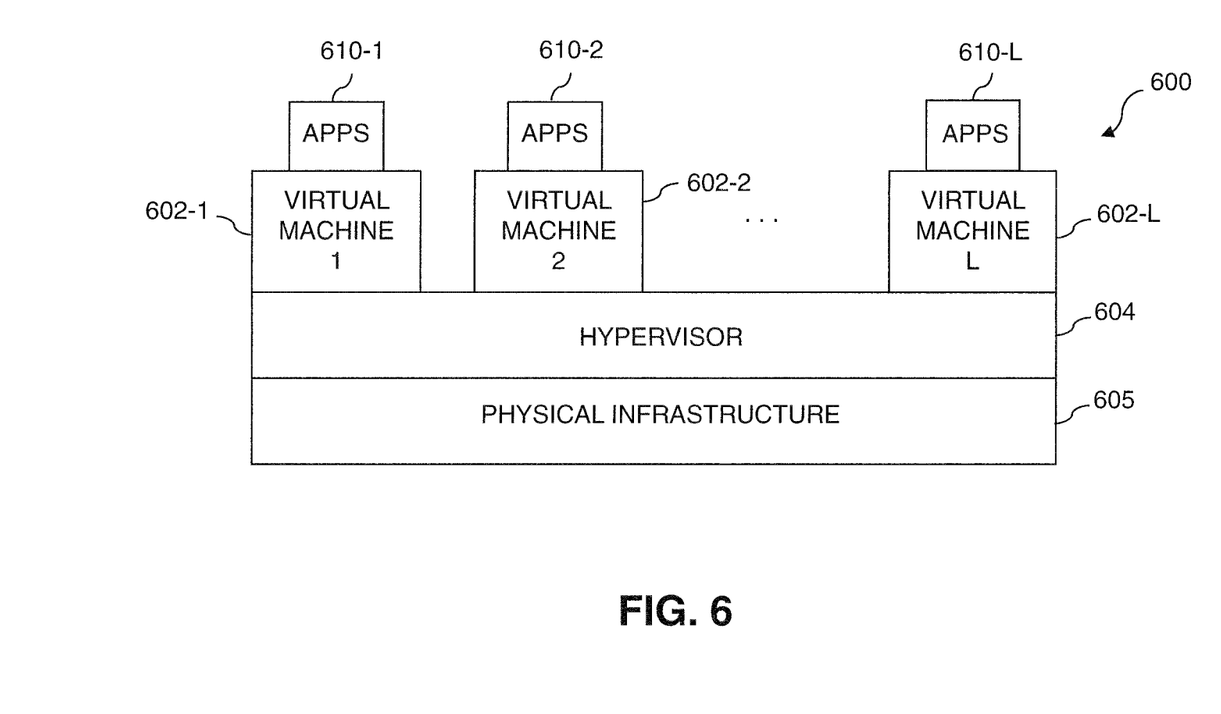
FIGS. 6 and 7 show examples of processing platforms that may be utilized to implement at least a portion of an information processing system in illustrative embodiments.
Figure 7:
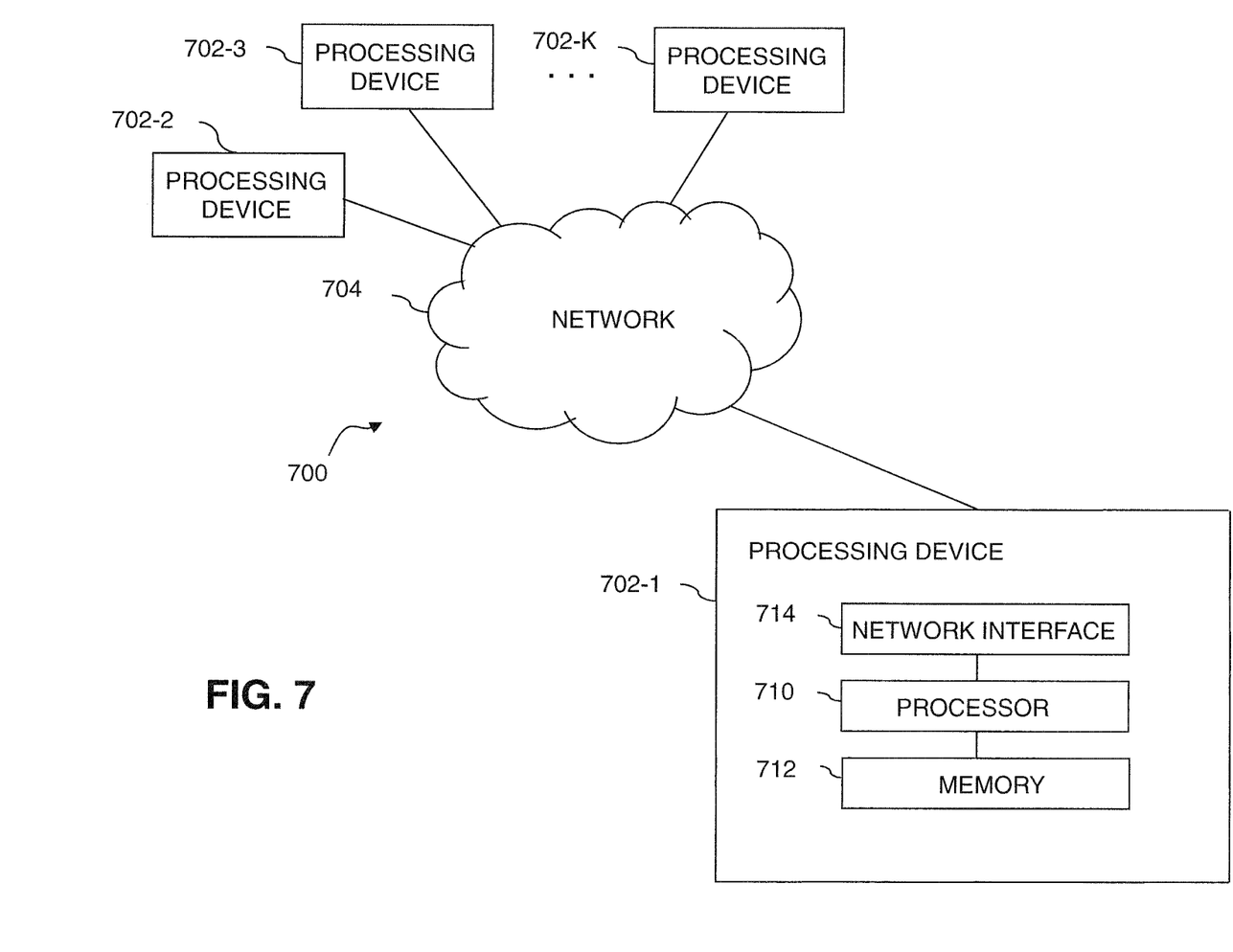

FIG. 6 shows an example processing platform comprising cloud infrastructure 600. The cloud infrastructure 600 comprises a combination of physical and virtual processing resources that may be utilized to implement at least a portion of the information processing system 100. The cloud infrastructure 600 comprises VMs 602-1, 602-2, . . . 602-L implemented using a hypervisor 604. The hypervisor 604 runs on physical infrastructure 605. The cloud infrastructure 600 further comprises sets of applications 610-1, 610-2, . . . 610-L running on respective ones of the virtual machines 602-1, 602-2, . . . 602-L under the control of the hypervisor 604.

Although only a single hypervisor 604 is shown in the embodiment of FIG. 6, the system 100 may of course include multiple hypervisors each providing a set of virtual machines using at least one underlying physical machine. Different sets of virtual machines provided by one or more hypervisors may be utilized in configuring multiple instances of various components of the system 100.

An example of a commercially available hypervisor platform that may be used to implement hypervisor 604 and possibly other portions of the information processing system 100 in one or more embodiments is the VMware® vSphere® which may have an associated virtual infrastructure management system such as the VMware® vCenter™. The underlying physical machines may comprise one or more distributed processing platforms that include one or more storage systems.

As is apparent from the above, one or more of the processing modules or other components of system 100 may each run on a computer, server, storage device or other processing platform element. A given such element may be viewed as an example of what is more generally referred to herein as a "processing device." The cloud infrastructure 600 shown in FIG. 6 may represent at least a portion of one processing platform. Another example of such a processing platform is processing platform 700 shown in FIG. 7.

The processing platform 700 in this embodiment comprises a portion of system 100 and includes a plurality of processing devices, denoted 702-1, 702-2, 702-3, . . . 702-K, which communicate with one another over a network 704.

The network 704 may comprise any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 702-1 in the processing platform 700 comprises a processor 710 coupled to a memory 712.

The processor 710 may comprise a microprocessor, a microcontroller, an application-specific integrated circuit (ASIC), a field-programmable gate array (FPGA) or other type of processing circuitry, as well as portions or combinations of such circuitry elements.

The memory 712 may comprise random access memory (RAM), read-only memory (ROM) or other types of memory, in any combination. The memory 712 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, the particular processing platform 700 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of a distributed processing system in an illustrative embodiment include VNX® and Symmetrix VMAX® storage arrays, software-defined storage products such as ScaleIO™ and ViPR®, all-flash and hybrid flash storage arrays such as Unity™, cloud storage products such as Elastic Cloud Storage (ECS), object-based storage products such as Atmos®, scale-out all-flash storage arrays such as XtremIO™, and scale-out NAS clusters comprising Isilon® platform nodes and associated accelerators, all from Dell EMC. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. For example, the disclosed techniques are applicable to a wide variety of other types of information processing systems in which it is desirable to provide intelligent resource matching and swarming. Also, the particular configurations of system and device elements and associated processing operations illustratively shown in the drawings can be varied in other embodiments. Thus, for example, the particular types of processing platforms, modules, cloud-based systems and virtual resources deployed in a given embodiment and their respective configurations may be varied. Moreover, the various assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. An apparatus comprising:
   at least one processing platform comprising a plurality of processing devices each comprising a processor coupled to a memory;
   the processing platform being configured to implement at least a portion of one or more cloud-based systems;
   wherein the processing platform further comprises:
   an artifact details analysis module configured to determine one or more enterprise resource attributes required for resolving a request artifact;
   an enterprise resource identification module configured to identify one or more available enterprise resources, across one or more cloud-based systems, associated with the one or more enterprise resource attributes required for resolving the request artifact; and
   an artifact-resource matching module configured:
   to determine one of the one or more identified available enterprise resources to assign to the request artifact based on one or more usage parameters attributed to the one or more identified available enterprise resources, wherein the one or more usage parameters attributed to the one or more identified available resources comprises a temporal parameter pertaining to how recently the identified available enterprise resources accepted request artifacts, wherein determining the one available enterprise comprises:
   filtering the identified available enterprise resources based at least in part on one or more pre-determined criteria pertaining to enterprise resource position within the enterprise;
   scoring the filtered enterprise resources based at least in part on one or more skills attributed thereto; and adjusting the scores for the filtered enterprise resources by applying an adaptive model to information pertaining to the filtered enterprise resources, wherein the adaptive model is trained on enterprise resource acceptance information and enterprise resource rejection information derived from historical request information related to the request artifact; and to route the request artifact to the determined available enterprise resource;

and wherein the artifact-resource matching module, upon receiving a rejection from the determined available enterprise resource with respect to accepting the routed request artifact, is further configured:

to determine a second of the one or more identified available enterprise resources to assign to the request artifact based on the one or more usage parameters attributed to the identified one or more available resources;

to route the request artifact to the second available enterprise resource; and to update the adaptive model using one or more items of information learned from the rejection from the determined available enterprise resource with respect to accepting the routed request artifact.

2. The apparatus of claim 1, wherein the artifact-resource matching module is further configured to learn one or more items of information from an outcome of routing the request artifact to the determined available enterprise resource.

3. The apparatus of claim 2, wherein the outcome comprises at least one of the determined available enterprise resource accepting the request artifact, the determined available enterprise resource rejecting the request artifact, and the determined available enterprise resource resolving the request artifact in accordance with one or more parameters.

4. The apparatus of claim 2, wherein the artifact-resource matching module is further configured to determine one of the one or more identified available enterprise resources to assign to the request artifact based on the one or more usage parameters attributed to the one or more identified available enterprise resources and the one or more learned items of information.

5. The apparatus of claim 1, wherein the request artifact comprises a service request.

6. The apparatus of claim 1, wherein the one or more enterprise resources comprises one or more technical service engineers.

7. The apparatus of claim 6, wherein the one or more enterprise resource attributes comprises one or more technical service engineer skills required for resolving the request artifact.

8. The apparatus of claim 1, wherein the artifact-resource matching module is further configured to route the request artifact to an exception queue upon receiving rejections from all of the one or more identified available enterprise resources.

9. The apparatus of claim 1, wherein the processing platform further comprises a team building module configured to determine one or more additional enterprise resource attributes related to resolving the request artifact distinct from enterprise resource attributes associated with the determined available enterprise resource.

10. The apparatus of claim 9, wherein the team building module is further configured to identify one or more additional available enterprise resources associated with the one or more additional enterprise resource attributes related to resolving the request artifact.

11. The apparatus of claim 9, wherein the team building module is further configured to determine one of the one or more identified additional available enterprise resources to request to join a request artifact resolution team with the determined available enterprise resource, based on the one or more usage parameters attributed to the one or more identified additional available resources.

12. The apparatus of claim 9, wherein the one or more additional enterprise resource attributes comprises one or more technical service engineer skills associated with one or more artifacts related to the request artifact.

13. A method comprising:

determining one or more enterprise resource attributes required for resolving a request artifact;

identifying one or more available enterprise resources associated with the one or more enterprise resource attributes, across one or more cloud-based systems, required for resolving the request artifact;

determining one of the one or more identified available enterprise resources to assign to the request artifact based on one or more usage parameters attributed to the one or more identified available enterprise resources, wherein the one or more usage parameters attributed to the one or more identified available resources comprises a temporal parameter pertaining to how recently the identified available enterprise resources accepted request artifacts, wherein determining the one available enterprise comprises:

filtering the identified available enterprise resources based at least in part on one or more pre-determined criteria pertaining to enterprise resource position within the enterprise;

scoring the filtered enterprise resources based at least in part on one or more skills attributed thereto; and adjusting the scores for the filtered enterprise resources by applying an adaptive model to information pertaining to the filtered enterprise resources, wherein the adaptive model is trained on enterprise resource acceptance information and enterprise resource rejection information derived from historical request information related to the request artifact;

routing the request artifact to the determined available enterprise resource; and upon receiving a rejection from the determined available enterprise resource with respect to accepting the routed request artifact:

determining a second of the one or more identified available enterprise resources to assign to the request artifact based on the one or more usage parameters attributed to the identified one or more available resources;

routing the request artifact to the second available enterprise resource; and updating the adaptive model using one or more items of information learned from the rejection from the determined available enterprise resource with respect to accepting the routed request artifact;

wherein the method is implemented in at least one processing platform configured to include a plurality of processing devices each comprising a processor coupled to a memory; and wherein the processing platform is configured to implement at least a portion of the one or more cloud-based systems.

14. The method of claim 13, further comprising:
determining one or more additional enterprise resource attributes related to resolving the request artifact distinct from enterprise resource attributes associated with the determined available enterprise resource; and
identifying one or more additional available enterprise resources associated with the one or more additional enterprise resource attributes related to resolving the request artifact.

15. A computer program product comprising a non-transitory processor-readable storage medium having stored therein program code of one or more software programs, wherein the program code when executed by a processing platform comprising a plurality of processing devices causes the processing platform:
to determine one or more enterprise resource attributes required for resolving a request artifact;
to identify one or more available enterprise resources associated with the one or more enterprise resource attributes, across one or more cloud-based systems, required for resolving the request artifact;
to determine one of the one or more identified available enterprise resources to assign to the request artifact based on one or more usage parameters attributed to the one or more identified available enterprise resources, wherein the one or more usage parameters attributed to the one or more identified available resources comprises a temporal parameter pertaining to how recently the identified available enterprise resources accepted request artifacts, wherein determining the one available enterprise comprises:
filtering the identified available enterprise resources based at least in part on one or more pre-determined criteria pertaining to enterprise resource position within the enterprise;
scoring the filtered enterprise resources based at least in part on one or more skills attributed thereto; and
adjusting the scores for the filtered enterprise resources by applying an adaptive model to information pertaining to the filtered enterprise resources, wherein the adaptive model is trained on enterprise resource acceptance information and enterprise resource rejection information derived from historical request information related to the request artifact;
to route the request artifact to the determined available enterprise resource; and
upon receiving a rejection from the determined available enterprise resource with respect to accepting the routed request artifact:
to determine a second of the one or more identified available enterprise resources to assign to the request artifact based on the one or more usage parameters attributed to the identified one or more available resources;
to route the request artifact to the second available enterprise resource; and
to update the adaptive model using one or more items of information learned from the rejection from the determined available enterprise resource with respect to accepting the routed request artifact;
wherein the processing platform is configured to implement at least a portion of the one or more cloud-based systems.

16. The computer program product of claim 15, wherein the program code further causes the processing platform to determine one or more additional enterprise resource attributes related to resolving the request artifact distinct from enterprise resource attributes associated with the determined available enterprise resource.

17. The computer program product of claim 15, wherein the program code further causes the processing platform to identify one or more additional available enterprise resources associated with the one or more additional enterprise resource attributes related to resolving the request artifact.

\* \* \* \* \*